United States Patent [19]

Krupke

[11] 4,053,852
[45] Oct. 11, 1977

[54] METHOD AND APPARATUS FOR GENERATING COHERENT NEAR 14 AND NEAR 16 MICRON RADIATION

[75] Inventor: William F. Krupke, Pleasanton, Calif.

[73] Assignee: The United States of America as represented by the United States Energy Research and Development Administration, Washington, D.C.

[21] Appl. No.: 594,822

[22] Filed: July 10, 1975

[51] Int. Cl.² .............................................. H01S 3/22
[52] U.S. Cl. .............................................. 331/94.5 G
[58] Field of Search ....................... 331/94.5; 330/4.3

[56] References Cited

U.S. PATENT DOCUMENTS 3,891,944  6/1975  Lavarini ........................ 331/94.5 G

OTHER PUBLICATIONS

Day et al., Proceedings of the IEEE, Nov. 1969, pp. 2060-2061.
Hartmann et al., Canadian J. of Physics, vol. 44, 1966, pp. 1609-1612.
CHEO in Lasers, Marcel Dekkar, Inc. (N.Y.) 1971, vol. 3, pp. 109, 125-135.

Primary Examiner—William L. Sikes
Attorney, Agent, or Firm—Dean E. Carlson; Roger S. Gaither; L. E. Carnahan

[57] ABSTRACT

A method and apparatus for producing coherent radiation in $CO_2$ vibrational-rotational transitions at wavelengths near 14 and 16 microns. This is accomplished by passing a mixture of $N_2$ and Ar through a glow discharge producing a high vibrational temperature in the $N_2$, passing the excited $N_2$ through a nozzle bank creating a supersonic flow thereof, injecting the $CO_2$ in the supersonic flow creating a population inversion in the $CO_2$, and directing the saturating pulse of radiation near 10.6 or 9.6 microns into the excited $CO_2$ creating a population inversion producing coherent radiation at 14 or 16 microns, respectively.

8 Claims, 7 Drawing Figures

METHOD AND APPARATUS FOR GENERATING COHERENT NEAR 14 AND NEAR 16 MICRON RADIATION

BACKGROUND OF THE INVENTION

The invention described herein was made in the course of, or under, Contract No. W-7405-ENG-48 with the U.S. Energy Research and Development Administration.

This invention relates to laser systems, and particularly to a method and apparatus for inducing laser action in $CO_2$, and more particularly to a method and apparatus for producing coherent radiation in $CO_2$ vibrational-rotational transitions at wavelengths near 14 and 16 microns.

In recent years, the kinetic and radiative properties of the $CO_2$ molecule have been exploited to produce powerful coherent radiation at wavelengths near 10.6 and 9.6 microns. As known, radiation at these wavelengths arises from stimulated emission in the 00°1 → 10°0 and 00°1 → 0.2°0 vibrational states or bands, respectively.

In general, $CO_2$ may be pumped by any means, which include conventional electric discharge pumping of $CO_2$ or $CO_2$ mixed with other gases to the 00°1 state or energy level, as generally known in the laser art. The drawback of this method of pumping is in that the populations of all energy levels or states, not just the 00°1 level, are raised and these enhanced lower level populations deleteriously affect laser action. In fact, recent exploratory experiments to produce 16 micron emission in $CO_2$ using direct electric dicharges were not successful. A prior known method for pumping $CO_2$ without increasing the lower states is the optical pumping of the 00°1 levels with an HBr laser. As described and claimed in copending U.S. patent application Ser. No. 594,821, filed July 10, 1975, entitled "A 16 Micron $CO_2$ Laser System", radiation of 16 microns can be accomplished by pumping to the 00°1 level, suppressing the usual 10.6 micron transition to the 10°0 level and encouraging the 9.6 micron transition, thereby populating the 02°0 level, as the principal prerequisite for 16 micron laser action between the 02°0 and 01¹0 levels. The above-referenced copending application additionally describes and claims an arc driven gas dynamic system for pumping the $CO_2$ without the above-referenced disadvantages produced by direct electric discharge pumping.

SUMMARY OF THE INVENTION

The present invention is directed to a method and apparatus for generating coherent 14 and 16 micron radiation in $CO_2$ and utilizes a glow discharge gas dynamic system and a bank of configured nozzles for pumping the $CO_2$, thus producing a substantial improvement over the arc driven system of the above-mentioned copending application and other known $CO_2$ laser systems. A mixture of $N_2$ and Ar is passed through a glow discharge region producing a high vibrational temperature in the $N_2$ gas while maintaining a relatively low gas temperature. After passing through a bank of contoured nozzles to a supersonic speed, precooled $CO_2$ is injected into the supersonic flow, creating an interaction zone where the cold $CO_2$ mixes with the translationally cooled $N_2$—Ar mixture causing pumping of the $CO_2$, whereafter a saturating pulse of 10.6 and/or 9.6 micron radiation is directed through the excited gas producing coherent radiation in the $CO_2$ at the 14 and 16 micron wavelengths.

Therefore, it is an object of this invention to provide a method and apparatus for generation of coherent radiation in $CO_2$.

A further object of the invention is to provide a method and mechanism for producing coherent radiation in $CO_2$ vibrational rotational transitions at wavelengths near 14 and 16 microns.

Another object of the invention is to provide 14 and 16 micron $CO_2$ laser system using a glow type gas dynamic arrangement for exiting the $CO_2$ and by Q-switching a saturated pulse of radiation into the excited $CO_2$.

Other objects of the invention will become readily apparent from the following description and accompanying drawings.

DESCRIPTION OF THE INVENTION

The present invention is a method and apparatus for producing coherent radiation in $CO_2$ vibrational-rotational transitions at wavelengths near 14 and 16 microns.

Figure 1:
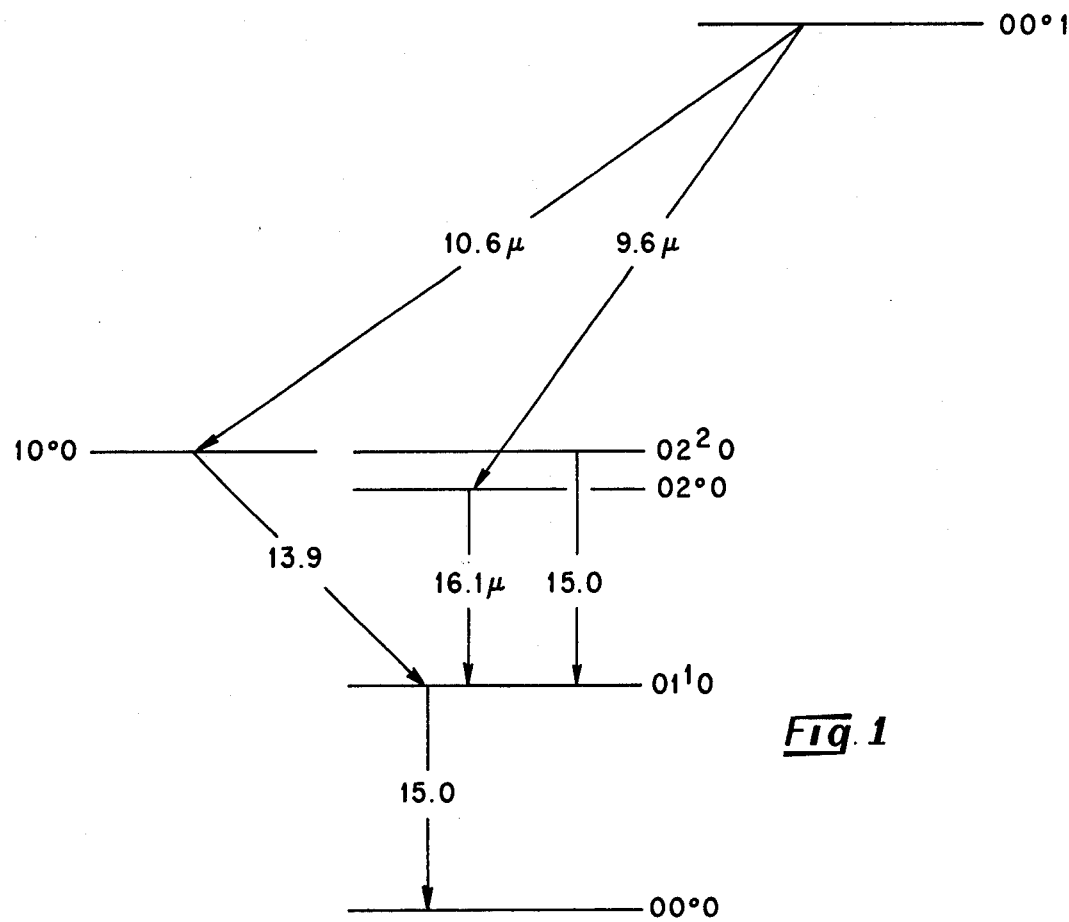
FIG. 1 illustrates the low lying vibrational levels of the $CO_2$ molecule.

The relevant low lying vibrational levels of the $CO_2$ molecule are shown in FIG. 1. To illustrate the inventive concept, imagine that the 00°1 vibrational level is excited by some means to a density $\overline{N}(00°1)$ and let the population density of the pure (00°$N_3$) mode be described by an effective temperature $T_3$. At the end of the pumping process let the population densities of the (10°0), (02°0) and (01¹0) vibrational levels be $\overline{N}(10°0)$, $\overline{N}(02°0)$, and $\overline{N}(01¹0)$, respectively, and the effective temperature be equal to $T_2$. If $T_3$ is sufficiently greater than $T_2$ the following processes can occur: (1) let a saturating pulse of radiation near 10.6 micron ($\mu$) corresponding to a 00°1 → 10°0 transition propagte through the pumped gas. This radiation may be generated in the pumped gas itself by Q-switching an optical resonator spanning the gas volume, or by injecting a Q-switched pulse from an external $CO_2$ laser. This saturating pulse will transfer approximately half of the initial 00°1 population density to the 10°0 level, creating a transient 10°0 population density $\overline{N}(10°0) \approx \frac{1}{2} \overline{N}(00°1)$. If $T_3$ is sufficiently greater than $T_2$, expressed by the equation $$\frac{1}{T_3} = \frac{1}{3383 \text{ cm}^{-1}} \left[ \frac{960 \text{ cm}^{-1}}{T_2} - .693 \right] (T \text{ in } °K)$$

the (10°0) level will be inverted with respect to the (01¹0) level providing gain near 14 (13.9) microns, e.g., $\bar{N}(10^{\circ}0) > \bar{N}(01^{1}0)/2$ where the factor of 2 takes into account the two-fold degeneracy of the lower level; (2) a transient population inversion can be induced between the $(02^{\circ}0)$ and $(01^{1}0)$ levels providing gain at a wavelength near 16 (16.1) microns, by saturating the $00^{\circ}1$ population with radiation near 9.6 microns in the $(00^{\circ}1) \rightarrow (02^{\circ}0)$ transition. Recent measurements suggests the time scale for the persistence of the transient $(02^{\circ}0) \rightarrow (01^{1}0)$ inversion, $\tau(02^{\circ}0)$, for a $CO_2$ pressure ($p$), is $$(p\tau)^{-1} = 4 \times 10^5 \sec^{-1} \text{torr}^{-1}$$

Figure 2:
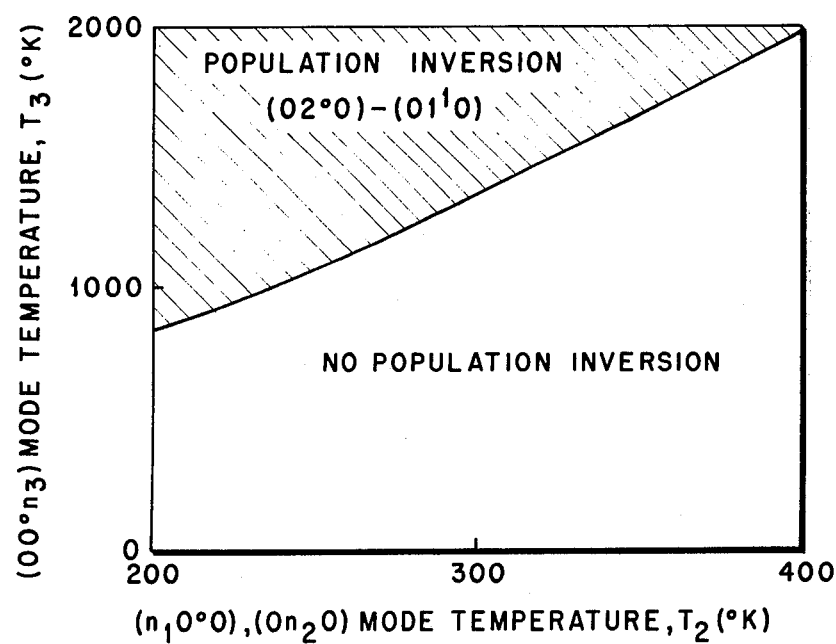
FIG. 2 graphically illustrates mode temperatures for 16 micron population inversions in $CO_2$.
Figure 3:
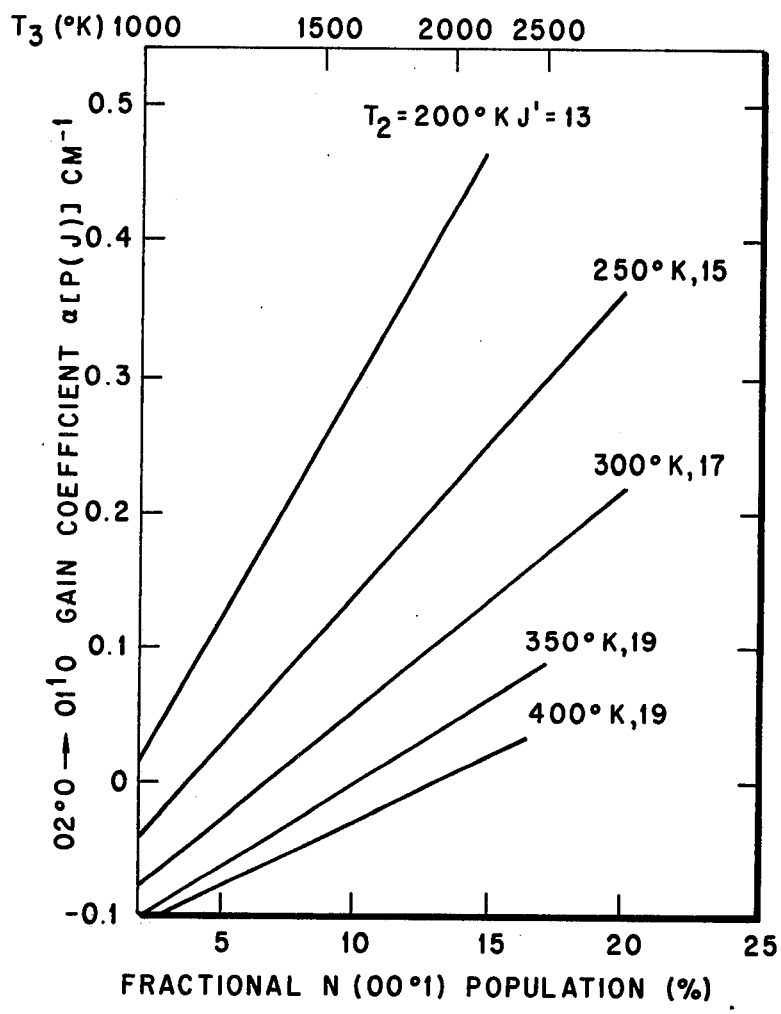
FIG. 3 graphically illustrates 02°0 → 01¹0 gain coefficient $\alpha[P(J)]$ cm$^{-1}$ vs. fractional N(00°1) population (%)

Thus, for a working pressure of one torr, the inversion would persist for 2.5 $\mu$sec, a time much longer than the typical Q-switch pulse width of several hundred nanoseconds. The required $T_3$, $T_2$ inequity for a population inversion and calculated P-branch small signal gain coefficients in the $(02^{\circ}0) \rightarrow (00^{1}0)$ band near 16 microns are shown in FIGS. 2 and 3. The sensitivity of gain coefficient to $T_2$ temperature should be noted. While FIGS. 2 and 3 are directed to the 16 micron wavelength for purposes of explanation, similar illustrations can be provided for the 14 micron wavelength.

Figure 7:
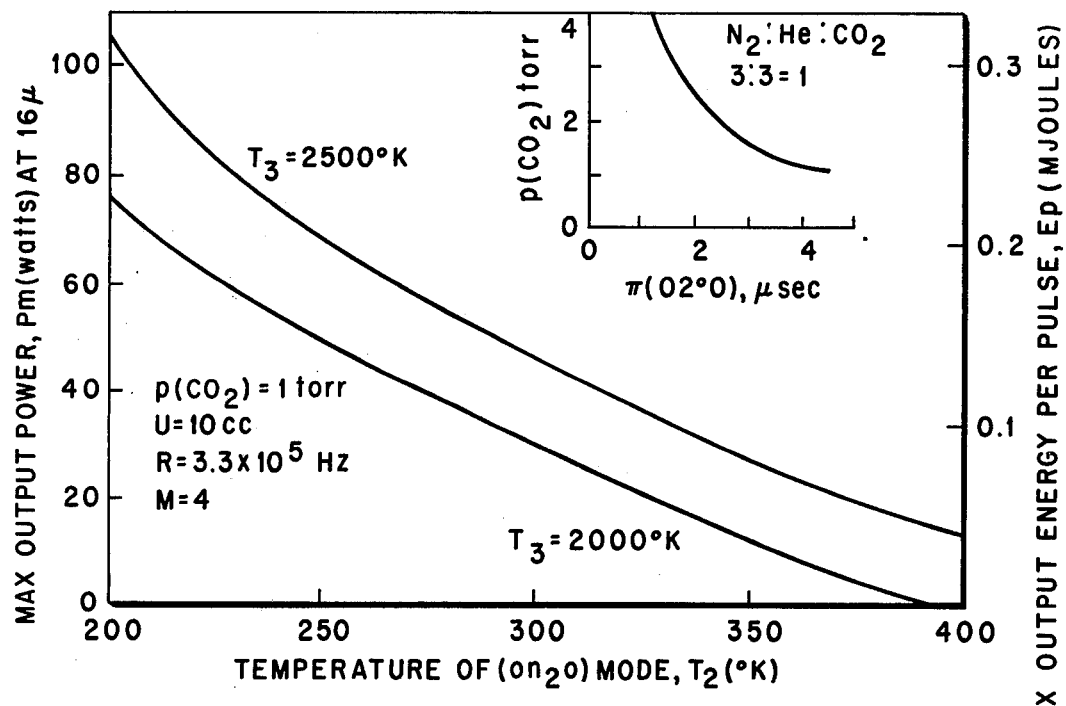
FIG. 7 graphically illustrates the power/energy performance of a 16 micron $CO_2$ laser.

There are several methods for the production of $T_3$, $T_2$ inequities. The most widely used technique is a direct electron discharge in $CO_2$. The drawback of this method is the increase of $T_2$ above the gas temperature rendering low absolute values of $T_2$ unfeasible, and as pointed out above, experiments using direct electric discharges were not successful. As also pointed out above, a prior known method which avoids raising $T_2$ above the ambient gas temperature while increasing $T_3$ entails optical pumping of the $(00^{\circ}1)$ levels with an HBr laser. The present invention provides a method and apparatus which leads to low absolute value of $T_2$ without need for an HBr laser, and lends itself to high average power as illustrated in FIG. 7, which utilizes a glow discharge gas dynamic system for exciting the $CO_2$ illustrated more generally in FIG. 4.

Figure 4:
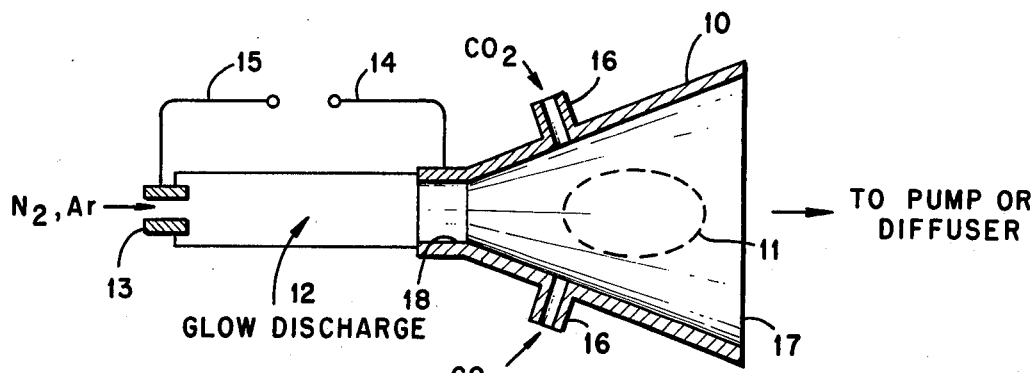
FIG. 4 schematically illustrates an electric-discharge (glow) gas dynamic $CO_2$ system.

The advantages of using a gas dynamic system for exciting $CO_2$ were set forth in the above-referenced pending application wherein an arc (thermal source) driven plenum for producing supersonic expansion of $N_2$ gas was described. Since what is really desired in a supersonic expansion is a high $N_2$ vibrational temperature, an electrically excited (glow) gas dynamic system configuration is illustrated in FIG. 4. Here, $N_2$ and, for example, Ar is introduced into a glow discharge region, where a high vibrational temperature $T_n$ is created in the $N_2$ gas, while maintaining the $N_2$ rotational and translational temperatures relatively low (typically 400° K). FIG. 4 comprises a generally diverging configured pleunum 10 defining a resonator or interaction region 11 therein, and being connected at the inlet thereof to a glow discharge plenum region 12 having an inlet 13 through which $N_2$ or an $N_2$-Ar mixture is introduced from a source as indicated by the arrow, the glow discharge region 12 being connected via leads 14 and 15 to a dc power supply, not shown, which produces an electrical discharge or glow through region 12 upon being activated, thereby exciting the $N_2$ or $N_2$—Ar mixture flowing therethrough. Plenum 10 is provided with inlets 16 (only two shown) through which precooled $CO_2$ is directed thereinto. Plenum 10 is connected at the outlet end thereof, indicated at 17, to a pump or diffuser as indicated by the arrow and legend.

$CO_2$, precooled to 200° K, for example, is introduced in the plenum 10 outside (forward of) region 11 and is mixed with the vibrationally excited $N_2$, that has passed into plenum 10 through an inlet nozzle 18, followed by supersonic expansion at the resonator region 11. For example, 200 torr of electrically excited $N_2$ + Ar was expanded with an area ratio of 6.3 to a Mach number of 3.55 resulting in translational/rotational temperatures of about 100° K in the supersonic flow. With such low $T_2$ temperatures availble, coupled with high $T_3$ temperatures, large 14 and 16$\mu$ gains can be achieved with a system based on the FIG. 4 embodiment, as described hereinafter in FIG. 5. Under lower Mach number operation, the $N_2/CO_2$ pressure in the plenum 10 can be increased to provide increased energy density, but with corresponding shorter $\tau(02^{\circ}0)$ time. Should this time become too short for internal buildup and saturation of the stored energy density, a stimulating external laser source can be coupled to the FIG. 4 flow configuration, as exemplified in the FIG. 5 embodiment. For optimum average power extraction from the flow, the external stimulating source should be repetition rated at the flow filling rate of the optical extraction region.

Figure 5:
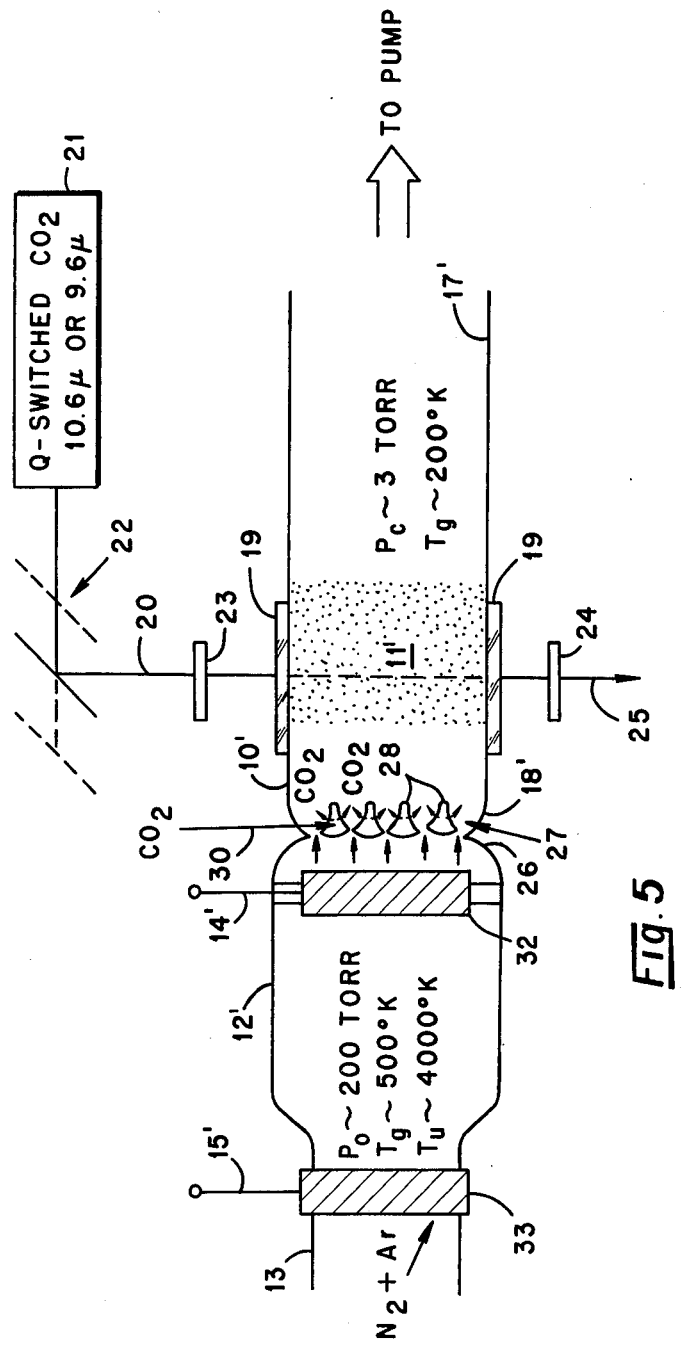
FIG. 5 illustrates an embodiment of an optically stimulated supersonic 16 micron $CO_2$ transfer laser system utilizing a glow discharge system functioning on the same principle as that of FIG. 4.

Referring now to FIG. 5, an embodiment of a supersonic 14 and 16 micron transfer laser system utilizing a glow type gas dynamic arrangement is illustrated, and components similar to those of FIG. 4 will be given similar reference numerals. The FIG. 5 embodiment comprises a plenum or chamber 10' of substantially uniform cross section and having an open outlet end indicated at 17' connected to a pump as indicated by the arrow and legend, and having a slightly converging inlet end 18'. Plenum 10' contains an interaction region 11' and is provided with windows 19 located adjacent region 11' which are transparent to 10.6$\mu$ or 9.6$\mu$ radiation pulses indicated at 20 from a Q-switched $CO_2$ laser 21, the pulses 20 from laser 21 being directed via a beam splitter-reflector arrangement, generally indicated at 22, through windows 19. A pair of dichroic mirrors 23 and 24 are positioned in spaced relation with respect to windows 19. Mirror 23 is constructed such that radiation of the 10.6$\mu$ and 9.6$\mu$ wavelength from laser 21 passes therethrough; and if desired this mirror can be replaced by a dispersive element, such as a prism or grating. Mirror 24 is of a partial transmitting type wherein some near 14-17$\mu$ radiation is transmitted while near 9-11$\mu$ radiation is reflected. Thus, radiation in the 13.9$\mu$ or 16.1$\mu$ wavelength produced in the interaction region 11' passes through mirror 24 as indicated by the arrow 25, it being understood that the 13.9$\mu$ radiation results from the $10^{\circ}0 \rightarrow 01^{1}0$ transition while the 16.1$\mu$ radiation results from the $02^{\circ}0 \rightarrow 01^{1}0$ transition, as described above. It is understood that the plenum 10' in cooperation with mirrors 23 and 24 define an optical resonator cavity as known in the laser art. A glow discharge plenum 12' having an inlet end 13' through which $N_2$ or $N_2$ + Ar gas is introduced from a source as indicated by the arrow, and having a converging outlet end 26 is connected to converging inlet end 18' of plenum 10' such that the respective converging ends 26 and 18'0 form a converging-diverging configuration having a throat section at the joining ends thereof within which is located a nozzle bank 27 composed of a plurality of contoured nozles 28, illustrated in detail in FIG. 6. Each nozzle 28 has an internal plenum 29 connected to a $CO_2$ source, as indicated by the arrow 30 and legend in FIG. 5, and a plurality of injection slots 31 on each side thereof (four shown). A pair of electrodes 32 and 33 are positioned in spaced relation in glow discharge plenum 12' and inlet end 13', respectively, and are connected via leads 14' and 15' with a dc power supply, not shown, for producing the desired electrical (glow) discharge thereacross.

Figure 6:
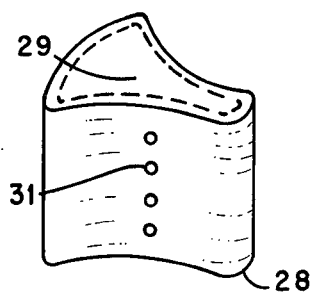
FIG. 6 is an enlarged view of the contoured nozzle of the FIG. 5 system.

In the embodiment illustrated in FIGS. 5 and 6, a mixture of $N_2$ and Ar, as indicated by the legend and arrow, at a pressure ($P_o$) of $\sim$ 200 torr is passed through the glow discharge plenum or region 12' producing a high vibrational temperature ($T_u$) $\sim$ 4000° K in the $N_2$ gas while maintaining a relatively low gas temperature ($T_g$) $\sim$ 500° K. After passing through nozzle bank 27 to a supersonic speed, precooled $CO_2$ ($\sim$ 200° K) is injected into the supersonic flow through injector slots 31 in nozzles 28, creating the interaction region or zone 11' where the cold $CO_2$ mixes with the translationally cooled $N_2$ + Ar gas, zone 11' having a pressure ($P_c$) of $\sim$ 3 torr and $T_g \sim$ 200° K. The (00°$n_3$) $CO_2$ vibrational modes rapidly equilibrate with the vibrational excited $N_2$ molecules, leading to the required population temperatures ($T_3$) without substantial increase in the gas temperature ($T_g$) which in the above discussion equals $T_2$. A saturating pulse of radiation, near 10.6$\mu$ or 9.6$\mu$ from Q-switch laser 21 propagate through the thus pumped gas in the interaction zone or region 11', which as described above, produces a gain near 14$\mu$ or 16$\mu$, this resulting from a $10°0 \rightarrow 01^10$ transition for near 14$\rightarrow$ radiation or $02°0 \rightarrow 01^10$ transition for near 16$\mu$ radiation, depending on the wavelength of the saturating pulse from laser 21.

FIG. 7 graphically shows the results of some simple estimates for the pulse energies and average power output capacity of a device using 10 cc of active volume (U), a Mach 4 flow (M), a pulse-repetition rate (R) of $3.3 \times 10^5$ Hz (the reciprocal of the laser volue filling rate) and a $CO_2$ pressure (p) of 1 torr. Performance is shown as a function of the temperature $T_2$ in the flow, for a $CO_2$ pressure of one torr and two values of the temperature $T_3$ (2000° K and 2500° K). It is anticipated that values of $T_2$ around 250° K and $T_3$ around 2000° K can be achieved in practice, opening the prospects for moderately high average power laser devices operating beyond 14 microns. Furthermore, a wide range of operating wavelengths can be achieved near 14 and 16 microns by using various isotopic $CO_2$ species.

By direct analogy, it is expected that stimulated emission in the equivalent transitions in $N_2O$ near 14.3 and 17.3 microns can be obtained, although direct measurements of the (10°0) and (02°0) level lifetimes have not yet been made. Similar radiation driven cascade population inversions may also be possible in OCS near 19 microns and in $CS_2$ near 25 microns.

It has thus been shown that the present invention provides a method and apparatus for producing coherent radiation in $CO_2$ vibrational-rotational transitions at wavelengths near 14 and 16 micron, thereby providing a substantial advance in the gas laser art.

While particular embodiments of the invention have been illustrated and described, modifications and changes will become apparent to those skilled in the art, and it is intended to cover in the appended claims all such modifications and changes that come within the spirit and scope of the invention.

What I claim is:

1. A method for producing coherent radiation in $CO_2$ vibrational-rotational transitions at wavelengths near 14 and near 16 microns composed of the steps of: passing a gaseous mixture of $N_2$ and Ar through a glow discharge region producing a high vibrational temperature in the $N_2$ while maintaining a relatively low gas temperature, passing the mixture through a nozzle bank causing a flow thereof at supersonic speed, injecting precooled $CO_2$ into the supersonic flow creating an interaction zone wherein the precooled $CO_2$ mixes with the translationally cooled $N_2$ — Ar mixture causing pumping of the $CO_2$, and directing a saturating pulse of radiation selected from the group consisting of near 10.6 microns and near 9.6 microns through the interaction zone creating a population inversion and thereby producing a gain in the near 14 micron wavelength when the saturating pulse of radiation is near 10.6 microns and in the near 16 micron wavelength when the saturating pulse of radiation is near 96 microns.

2. The method defined in claim 1, wherein the saturating pulse of radiation is near 10.6 microns and the gain is near 14 micron wavelength.

3. The method defined in claim 1, wherein the saturating pulse of radiation is near 9.6 microns and the gain is near 16 micron wavelength.

4. The method defined in claim 1, wherein the gaseous mixture of $N_2$ and Ar in the glow discharge region is at a pressure of about 200 torr, a gas temperature of about 500° K and a vibrational temperature of about 4000° K.

5. The method defined in claim 1, wherein the interaction zone is at a pressure of 1-3 torr, a gas temperature of 200°-250° K, and a transition temperature of 2000°-2500° K.

6. An apparatus for generating coherent near 14 and near 16 micron radiation comprising: a first plenum, a second plenum, said first and second plenums being interconnected by a nozzle bank capable of producing a supersonic speed of fluid flowing from said first plenum into said second plenum, electrode means located in said first plenum for creating an electrical glow discharge region therein, said nozzle bank being composed of a plurality of contoured nozzles each having a plurality of injection slots therein; said second plenum being provided with a pair of oppositely located windows, a pair of mirrors positioned external of said second plenum and in spaced relation with respect to said windows, Q-switched laser means capable of producing near 10.6 micron or near 9.6 micron radiation located external of said plenums, means for directing radiation from said laser means through said window means into said second plenum, means for directing a first gas selected from the group consisting of $N_2$ and $N_2$-Ar into said first plenum, and means for directing a second gas composed of precooled $CO_2$ through said injection slots of said nozzles, whereby the first gas is passed through said glow discharge region producing a high vibrational temperature in the gas while maintaining a relatively low gas temperature whereafter the gas is passed through said nozzle bank creating a supersonic flow into which the second gas is injected through said injector slots creating an interaction zone in said second plenum intermediate said windows where the precooled second gas mixes with the translationally cooled first gas whereby vibrational modes of the second gas rapidly equilibrate with the vibrational excited first gas leading to pumping of the second gas whereupon a saturating pulse of radiation from said laser means is directed through said second gas creating a population inversion resulting in an output gain.

7. The apparatus defined in claim 6, wherein each of said contoured nozzles comprises a gas plenum and a pair of concave sides, said plenum being connected to a source of precooled gas, said injector slots being located in each of said concave sides, whereby gas from said plenum is ejected through said injector nozzles.

8. The apparatus defined in claim 6, wherein one of said mirrors is constructed to reflect radiation near 9–11 microns and transmit radiation near 14–17 microns.

* * * * *